United States Patent
Jeong et al.

(10) Patent No.: US 10,634,196 B2
(45) Date of Patent: Apr. 28, 2020

(54) DOUBLE CLUTCH APPARATUS FOR HYBRID ELECTRIC VEHICLE

(71) Applicants: Hyundai Motor Company, Seoul (KR); Kia Motors Corporation, Seoul (KR)

(72) Inventors: Euihee Jeong, Hwaseong-si (KR); In Tae Park, Hwaseong-si (KR); Jong Min Kim, Busan (KR); Jinwoo Lee, Dongsong-eup (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 398 days.

(21) Appl. No.: 15/674,300

(22) Filed: Aug. 10, 2017

(65) Prior Publication Data
US 2018/0163793 A1  Jun. 14, 2018

(30) Foreign Application Priority Data
Dec. 14, 2016 (KR) .................. 10-2016-0170788

(51) Int. Cl.
*F16D 25/10* (2006.01)
*F16D 25/0638* (2006.01)
*B60K 6/387* (2007.10)
*F16D 13/52* (2006.01)
*F16D 13/38* (2006.01)
*B60K 6/547* (2007.10)
(Continued)

(52) U.S. Cl.
CPC .......... *F16D 25/0638* (2013.01); *B60K 6/387* (2013.01); *B60K 6/48* (2013.01); *B60K 6/547* (2013.01); *F16D 13/385* (2013.01); *F16D 13/52* (2013.01); *F16D 25/082* (2013.01); *F16D 25/10* (2013.01); *B60K 2006/4825* (2013.01); *B60Y 2200/92* (2013.01); *B60Y 2400/424* (2013.01); *B60Y 2400/428* (2013.01); *Y02T 10/6295* (2013.01); *Y10S 903/914* (2013.01)

(58) Field of Classification Search
CPC .... F16D 25/0638; F16D 25/082; F16D 25/10; F16D 13/385; F16D 13/52; B60Y 2400/428
See application file for complete search history.

(56) References Cited

U.S. PATENT DOCUMENTS 9,051,976 B2  6/2015  Kuwahara et al.
2006/0144665 A1* 7/2006  Janson .................. B60K 6/48
192/48.8
(Continued)

FOREIGN PATENT DOCUMENTS

JP  2003-063261 A  3/2003
KR  10-1459777 B1  11/2014

*Primary Examiner* — Huan Le
(74) *Attorney, Agent, or Firm* — Morgan, Lewis & Bockius LLP

(57) ABSTRACT

A double clutch apparatus for a hybrid electric vehicle for transmitting torques of an engine and a motor to first and second input shafts includes two clutches formed in a volume between the rotor and the two coaxial input shafts, two slave cylinders operating the two clutches, an engine clutch shaft coaxially disposed between the two input shafts and an engine output shaft and connected to the rotor, an engine clutch disposed between the engine output shaft and the engine clutch shaft, and a third slave cylinder operating the engine clutch.

12 Claims, 3 Drawing Sheets

(51) Int. Cl.
*B60K 6/48* (2007.10)
*F16D 25/08* (2006.01)

(56) References Cited

U.S. PATENT DOCUMENTS

| | | | | |
|---|---|---|---|---|
| 2009/0000896 A1* | 1/2009 | Knowles | ................ | B60K 6/387 |
| | | | | 192/48.1 |
| 2015/0024903 A1* | 1/2015 | Jeong | ...................... | F16D 21/08 |
| | | | | 477/5 |
| 2018/0231067 A1* | 8/2018 | Lorenz | ................... | F16D 21/06 |

* cited by examiner

DOUBLE CLUTCH APPARATUS FOR HYBRID ELECTRIC VEHICLE

CROSS-REFERENCE(S) TO RELATED APPLICATIONS

The present application claims priority to Korean Patent Application No. 10-2016-0170788 filed on Dec. 14, 2016, the entire contents of which are incorporated herein for all purposes by this reference.

BACKGROUND OF THE INVENTION

Field of the Invention

The present invention relates to a double clutch for a hybrid electric vehicle. More particularly, the present invention relates to a double clutch for a hybrid electric vehicle with reduces an overall length of a transmission, obviates oil leakage, and improves a shift performance.

Description of Related Art

An environmentally-friendly technology of a vehicle is a core technology which controls the survival of a future automobile industry. Advanced car makers have focused their energy on the development of an environmentally-friendly vehicle to achieve environmental and fuel efficiency regulations.

An electric vehicle (EV) or a hybrid electric vehicle (HEV) that utilizes electrical energy, or a double clutch transmission (DCT) which improves the efficiency and convenience of a transmission may be examples of such a future vehicle technology.

The hybrid electric vehicle is a vehicle using two or more power sources. The two or more power sources may be combined by various schemes, and a gasoline engine or a diesel engine using the existing fossil fuel with a motor and/or generator driven by electrical energy are combined and used as the hybrid power sources.

The DCT alternatingly activates odd-numbered shift-stages and even-numbered shift-stages by alternatingly operating two clutches, and thereby improves continuity in torque transmission.

Recently, such a DCT is applied to a hybrid electric vehicle (HEV) to enhance an efficiency and fuel consumption.

The information disclosed in this Background of the Invention section is only for enhancement of understanding of the general background of the invention and should not be taken as an acknowledgment or any form of suggestion that this information forms the prior art already known to a person skilled in the art.

BRIEF SUMMARY

A double clutch apparatus for a hybrid electric vehicle according an exemplary embodiment is configured for selectively transmitting torques of an engine and a motor to coaxially disposed first and second input shafts. Such a double clutch apparatus includes first clutch and second clutch formed between an internal circumference of a rotor and the first and second input shafts, the first clutch and second clutch being formed opposite to each other with respect to a rotor hub of the rotor. The double clutch apparatus further includes a first and a second slave cylinder disposed at a first and a second wall of a transmission housing and operating the first and second clutches, respectively. The double clutch apparatus further includes an engine clutch shaft coaxially disposed between the first and second input shafts and an engine output shaft, and connected to the rotor of the motor by a connecting member. The double clutch apparatus further includes an engine clutch disposed between the engine output shaft and the engine clutch shaft. The double clutch apparatus further includes a third slave cylinder formed at the first wall and operating the engine clutch.

The first clutch may include a plurality of first clutch plates spline-engaged with an internal circumference of the rotor, a first clutch hub spline-engaged with an external circumference of the first input shaft, a first clutch disks alternatingly disposed between the first clutch plates and spline-engaged with an external circumference of the first clutch hub, and a first piston disposed opposite to the rotor hub with respect to the first clutch plates and disks, and axially movable to operate the first clutch plates and disks.

The first clutch hub may be rotatably supported by the rotor hub interposing a bearing.

The second clutch may include a plurality of second clutch plates spline-engaged with an internal circumference of the rotor, a second clutch hub spline-engaged with an external circumference of the second input shaft, a second clutch disks alternatingly disposed between the second clutch plates and spline-engaged with an external circumference of the second clutch hub, and a second piston disposed opposite to the rotor hub with respect to the second clutch plates and disks, and axially movable to operate the second clutch plates and disks.

The second clutch hub may be rotatably supported by the rotor hub interposing a bearing.

The rotor hub may be rotatably supported by the first input shaft interposing a bearing.

Cylinder rods of the first and second slave cylinders may be rotatably supported by the first clutch and second clutch interposing bearings, respectively.

The engine clutch shaft may penetrate a first wall of the transmission housing and spline-engaged with the connecting member.

The connecting member may be fixedly connected to the rotor.

The engine clutch may include a reaction plate spline-engaged with the engine output shaft, a plurality of engine clutch plates spline-engaged with an internal surface of the reaction plate, an engine clutch hub spline-engaged with an external circumference of the engine clutch shaft, an engine clutch disks alternatingly disposed between the engine clutch plates and spline-engaged with the engine clutch hub, and an engine clutch piston disposed close to the reaction plate interposing a spring and axially movable to operate the engine clutch plates and disks.

A cylinder rod of the third slave cylinder may be rotatably supported by the engine clutch interposing a bearing.

A thrust bearing may be interposed between the reaction plate and the engine clutch shaft.

According to a double clutch apparatus for a hybrid electric vehicle according to an exemplary embodiment of the present invention, a volume of a motor inside a transmission housing is utilized wherein the first clutch and second clutch constituting a double clutch transmission may be formed within an internal circumference of a rotor, and the two clutches may be modularized with the motor, reducing an overall length of a transmission. In addition, slave cylinders are employed to operate two transmission clutches and an engine clutch, and an oil leakage typical in a wet-type clutch may be obviated.

In addition, the two transmission clutches are formed at an internal circumference of the rotor, and a rotational inertia of clutch disks may be decreased and shift performance may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
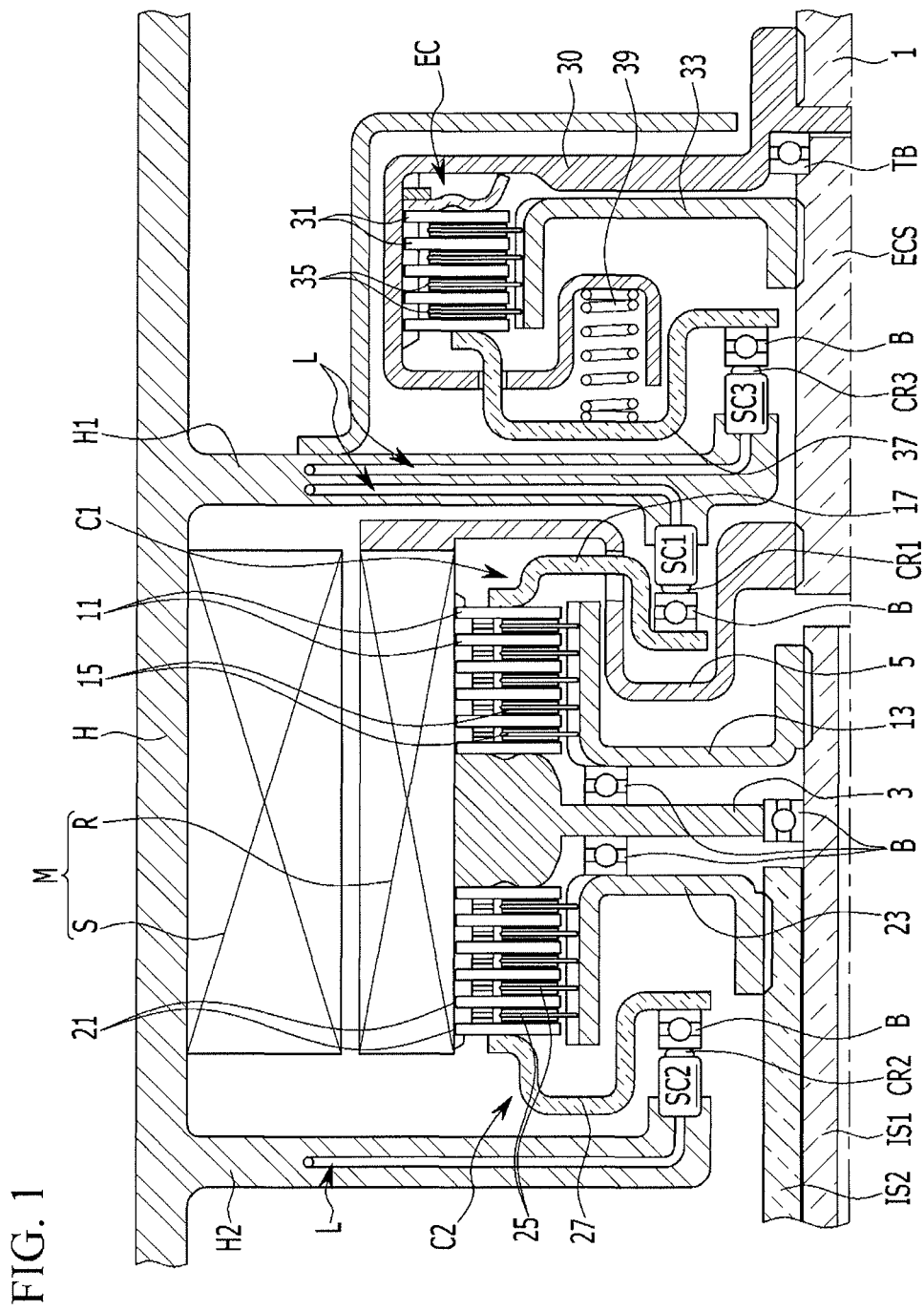
FIG. 1 is a cross-sectional view of a double clutch apparatus for a hybrid electric vehicle according to an exemplary embodiment of the present invention.

It should be understood that the appended drawings are not necessarily to scale, presenting a somewhat simplified representation, of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments with may be included within the spirit and scope of the invention as defined by the appended claims.

In the following description, dividing names of components into first, second and the like is to divide the names because the names of the components are the same as each other and an order thereof is not particularly limited.

FIG. 1 is a cross-sectional view of a double clutch apparatus for a hybrid electric vehicle according to an exemplary embodiment of the present invention.

Referring to FIG. 1, a double clutch apparatus for a hybrid electric vehicle according to an exemplary embodiment of the present invention (hereinafter, double clutch apparatus) receives torque from a motor M and an engine through an engine output shaft 1, and selectively outputs the received torque to a transmission apparatus through first and second input shaft IS1 and IS2 by operating first clutch and second clutch C1 and C2.

Here, the motor M includes a rotor R and a stator S, and is configured as a motor and a generator that generates electricity, as in an electric vehicle.

The rotor R is rotatably supported by one input shaft of the two input shafts IS1 and IS2 by a rotor hub 3, and the stator S is fixed to a transmission housing H.

The first input shaft IS1 transmits a torque to the odd-numbered shift-stages of the transmission apparatus, and the second input shaft IS2 transmits a torque to the even-numbered shift-stages of the transmission apparatus. The second input shaft IS2 is coaxially disposed at an external circumference of the first input shaft IS1 without rotational interference.

In such a power system of a hybrid electric vehicle, a double clutch apparatus according to an exemplary embodiment of the present invention includes the first clutch and second clutch C1 and C2, an engine clutch shaft ECS, an engine clutch EC, and first, second and third slave cylinders SC1, SC2, and SC3.

The first clutch and second clutch C1 and C2 selectively transmit the torque of the motor M and the engine to the first and second input shafts IS1 and IS2, and the engine clutch EC selectively transmits the torque of the engine to the engine clutch shaft ECS.

Hereinafter, a double clutch apparatus according to an exemplary embodiment of the present invention is described in further detail.

As shown in FIG. 1, the first clutch and second clutch C1 and C2 are disposed between an internal circumference of the rotor and the first and second input shafts IS1 and IS2. The rotor hub 3 is interposed between the first clutch and second clutch C1 and C2.

Regarding the first clutch C1, a plurality of first clutch plates 11 are spline-engaged with the internal circumference of the rotor R.

In addition, a first clutch hub 13 is spline-engaged with an external circumference of the first input shaft IS1. First clutch disks 15 are disposed alternatingly between the first clutch plates 11 and spline-engaged with an external circumference of the first clutch hub 13.

A first piston 17 is disposed at an opposite position of the rotor hub 3 with respect to the first clutch plates 11 and the first clutch disks 15, and is axially movable by the first slave cylinder SC1 to operate the first clutch plates 11 and the first clutch disks 15.

The first clutch hub 13 is rotatable relative with the rotor hub 3 by being supported by a side wall of the rotor hub 3 through a bearing B.

Regarding the second clutch C2, a plurality of second clutch plates 21 are spline-engaged with the internal circumference of the rotor R.

In addition, a second clutch hub 23 is spline-engaged with an external circumference of the second input shaft IS2. Second clutch disks 25 are disposed alternatingly between the second clutch plates 21 and spline-engaged with an external circumference of the second clutch hub 23.

A second piston 27 is disposed at an opposite position of the rotor hub 3 with respect to the second clutch plates 21 and the second clutch disks 25, and is axially movable by the second slave cylinder SC2 to operate the second clutch plates 21 and the second clutch disks 25.

The second clutch hub 23 is rotatable relative with the rotor hub 3 by being supported by a side wall of the rotor hub 3 through a bearing B.

The rotor hub 3 is rotatably mounted on the first input shaft IS1 through a bearing B, and is configured as a reaction plate that supports the first and second clutch plates 11 and 21 in an axial direction against an operational force of the first and second pistons 17 and 27 when the first clutch and second clutch C1 and C2 are operated.

The first and second slave cylinders SC1 and SC2 are respectively disposed at first and second walls H1 and H2 of the transmission housing H. Receiving a hydraulic pressure through a hydraulic line L formed inside the first and second walls H1 and H2, the first and second slave cylinders SC1 and SC2 respectively operate the first and second pistons 17 and 27 of the first clutch and second clutch C1 and C2 in an axial direction by respective cylinder rods CR1 and CR2.

The cylinder rods CR1 and CR2 of the first and second slave cylinders SC1 and SC2 are rotatably supported by the first and second pistons 17 and 27 interposed by bearings B, and the first and second slave cylinders SC1 and SC2 may be formed as typical concentric slave cylinders (CSC).

The engine clutch shaft ECS is coaxially disposed between the first and second input shafts IS1 and IS2 and the engine output shaft 1, and connected to the rotor R of the motor M by a connecting member 5.

That is, the engine clutch shaft ECS penetrates the second wall H2 of the transmission housing H, and spline-engaged with the connecting member 5.

The connecting member 5 is fixed to the rotor R and rotates with the rotor R.

The engine clutch EC is disposed between the engine output shaft 1 and the engine clutch shaft ECS.

In the engine clutch EC, a reaction plate 30 is spline-engaged with the engine output shaft 1, and a plurality of engine clutch plates 31 are spline-engaged with an internal of surface of the reaction plate 30.

An engine clutch hub 33 is spline-engaged with an external circumference of the engine clutch shaft ECS. Engine clutch disks 35 are alternatingly disposed between the engine clutch plates 31 and spline-engaged with an external surface of the engine clutch hub 33.

An engine clutch piston 37 is disposed close to the reaction plate 30 interposing a spring 39, and the engine clutch piston 37 operates the engine clutch plates 31 and the engine clutch disks 35 by the third slave cylinder SC3.

A thrust bearing TB is disposed between the reaction plate 30 and the engine clutch shaft ECS, wherein the reaction plate 30 and the engine clutch shaft ECS may relatively rotate.

The third slave cylinder SC3 is disposed at the first wall H1 of the transmission housing H. Receiving a hydraulic pressure through a hydraulic line L formed inside the first wall H1, the third slave cylinder SC3 operates the engine clutch piston 37 of the engine clutch EC in an axial direction by a cylinder rod CR3.

The cylinder rod CR3 of the third slave cylinder SC3 is rotatably supported by the engine clutch piston 37 interposed by bearings B, and the third slave cylinder SC3 may be formed as a typical concentric slave cylinder (CSC).

Figure 2:
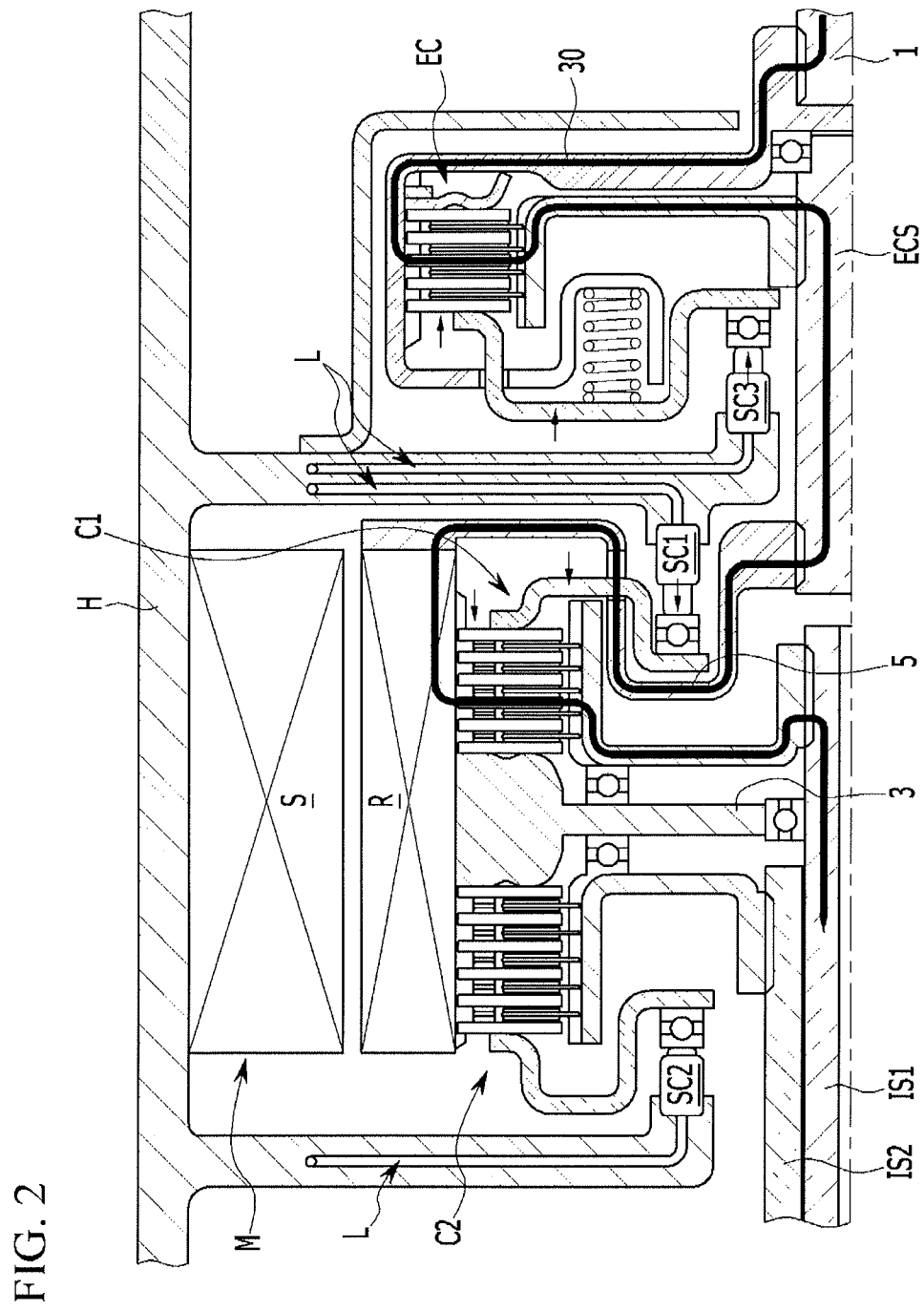
FIG. 2 illustrates a first operational diagram of a double clutch apparatus for a hybrid electric vehicle according to an exemplary embodiment of the present invention.
Figure 3:
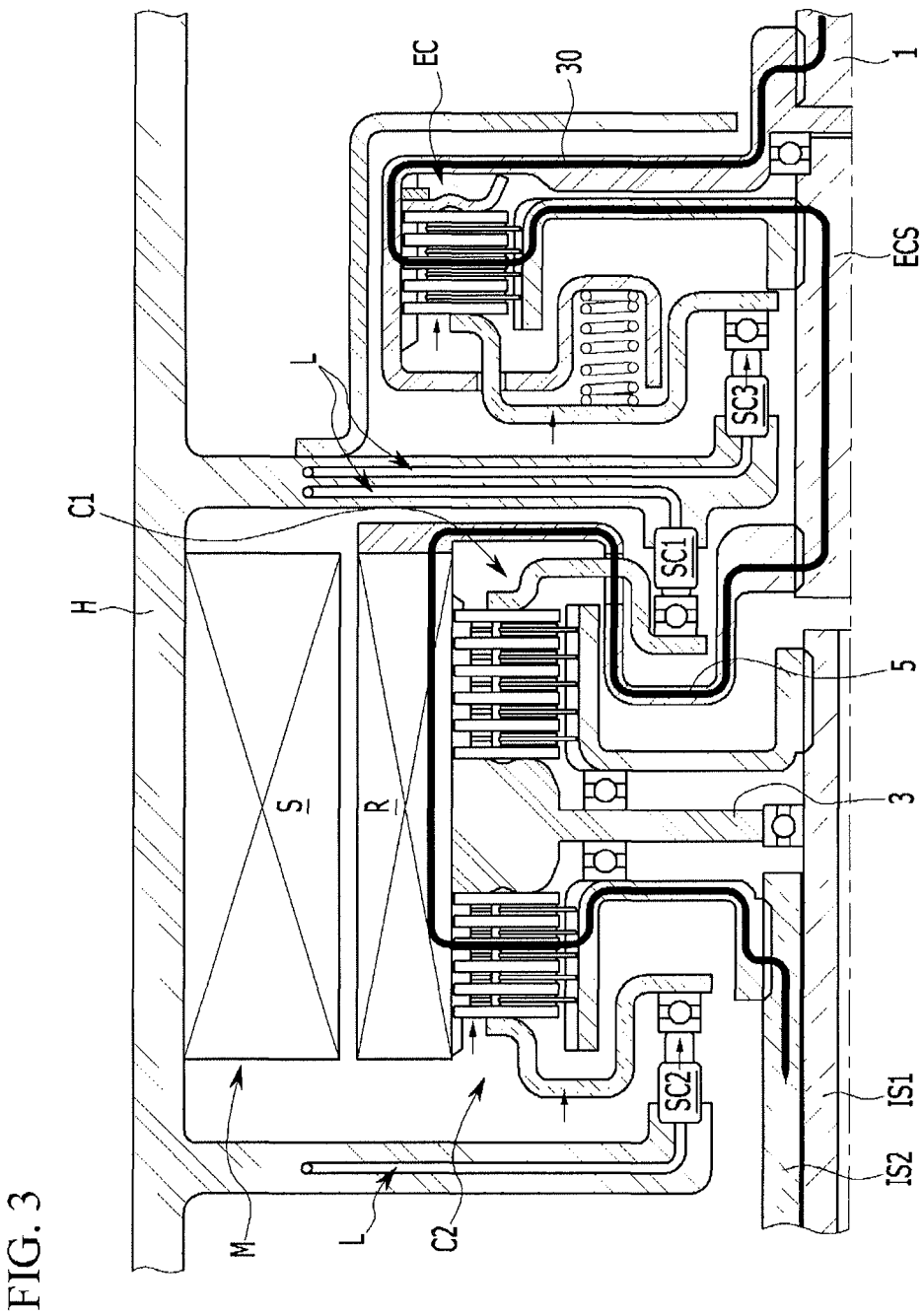
FIG. 3 illustrates a second operational diagram of a double clutch apparatus for a hybrid electric vehicle according to an exemplary embodiment of the present invention.

FIG. 2 illustrates a first operational diagram of a double clutch apparatus for a hybrid electric vehicle according to an exemplary embodiment of the present invention. FIG. 3 illustrates a second operational diagram of a double clutch apparatus for a hybrid electric vehicle according to an exemplary embodiment of the present invention.

Hereinafter, an operation of such a double clutch apparatus is described in detail with reference to FIG. 2 and FIG. 3.

Referring to FIG. 2, to realize odd-numbered shift-stages, the first and third slave cylinders SC1 and SC3 are operated to transmit the torque of the engine output shaft 1 (i.e., the torque of the engine) to the first input shaft IS1.

As such, the first clutch C1 and the engine clutch EC are operated, and the torque from an engine is transmitted through the engine output shaft 1, the engine clutch EC, the engine clutch shaft ECS, the connecting member 5, the rotor R, the first clutch C1, and the first input shaft IS1, consecutively.

For an HEV mode where the vehicle is driven by both the engine and the motor M, the motor M may be operated wherein the torque of the motor M may be further delivered to the first input shaft IS1 through the first clutch C1.

In an EV mode where the engine stops and the vehicle is driven only by the torque of the motor M, the first clutch C1 remains operated and the third slave cylinder SC3 is released. In the present case, the vehicle is driven only by the torque of the motor M.

Referring to FIG. 3, to realize even-numbered shift-stages, the second and third slave cylinders SC2 and SC3 are operated to transmit the torque of the engine output shaft 1 (i.e., the torque of the engine) to the second input shaft IS2.

As such, the second clutch C2 and the engine clutch EC are operated, and the torque from an engine is transmitted through the engine output shaft 1, the engine clutch EC, the engine clutch shaft ECS, the connecting member 5, the rotor R, the second clutch C2, and the second input shaft IS2, consecutively.

For an HEV mode where the vehicle is driven by both the engine and the motor M, the motor M may be operated wherein the torque of the motor M may be further delivered to the second input shaft IS2 through the second clutch C1.

In an EV mode where the engine stops and the vehicle is driven only by the torque of the motor M, the second clutch C2 remains operated and the third slave cylinder SC3 is released. In the present case, the vehicle is driven only by the torque of the motor M.

According to a double clutch apparatus for a hybrid electric vehicle according to an exemplary embodiment of the present invention, a volume of a motor inside a transmission housing is utilized wherein first clutch and second clutch constituting a double clutch transmission may be formed within an internal circumference of a rotor, and the two clutches may be modularized with the motor, reducing an overall length of a transmission.

In addition, slave cylinders are employed to operate two transmission clutches and an engine clutch, and an oil leakage typical in a wet-type clutch may be obviated.

In addition, the two transmission clutches are formed between an internal circumference of the rotor, and a rotational inertia of clutch disks may be decreased and shift performance may be improved.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications are variations are possible in light of the above teachings. The exemplary embodiments were chosen and described to explain certain principles of the invention and their practical application, to enable others skilled in the art to make and utilize various exemplary embodiments of the present inven-

What is claimed is:

1. A double clutch apparatus for a hybrid electric vehicle for selectively transmitting torque of an engine and a motor to coaxially disposed first and second input shafts, the double clutch apparatus including:
   a first clutch and a second clutch formed between an internal circumference of a rotor and the first and second input shafts, the first clutch and the second clutch being formed opposite to each other with respect to a rotor hub of the rotor;
   first and second slave cylinders disposed at a first wall and a second wall of a transmission housing and operating the first clutch and the second clutch, respectively;
   an engine clutch shaft coaxially disposed between the first and second input shafts and an engine output shaft, and connected to the rotor of the motor by a connecting member;
   an engine clutch disposed between the engine output shaft and the engine clutch shaft; and
   a third slave cylinder formed at the first wall and operating the engine clutch.

2. The double clutch apparatus of claim 1, wherein the first clutch includes:
   a plurality of first clutch plates spline-engaged with the internal circumference of the rotor;
   a first clutch hub spline-engaged with an external circumference of the first input shaft;
   a plurality of first clutch disks alternatingly disposed between the plurality of first clutch plates and spline-engaged with an external circumference of the first clutch hub; and
   a first piston disposed opposite to the rotor hub with respect to the plurality of first clutch plates and the plurality of first clutch disks, and axially movable to operate the plurality of first clutch plates and the plurality of first clutch disks.

3. The double clutch apparatus of claim 2, wherein the first clutch hub is rotatably supported by the rotor hub interposing a bearing.

4. The double clutch apparatus of claim 1, wherein the second clutch includes:
   a plurality of second clutch plates spline-engaged with the internal circumference of the rotor;
   a second clutch hub spline-engaged with an external circumference of the second input shaft;
   a plurality of second clutch disks alternatingly disposed between the plurality of second clutch plates and spline-engaged with an external circumference of the second clutch hub; and
   a second piston disposed opposite to the rotor hub with respect to the plurality of second clutch plates and the plurality of second clutch disks, and axially movable to operate the plurality of second clutch plates and the plurality of second clutch disks.

5. The double clutch apparatus of claim 4, wherein the second clutch hub is rotatably supported by the rotor hub interposing a bearing.

6. The double clutch apparatus of claim 1, wherein the rotor hub is rotatably supported by the first input shaft interposing a bearing.

7. The double clutch apparatus of claim 1, wherein cylinder rods of the first and second slave cylinders are rotatably supported by the first clutch and the second clutch interposing bearings.

8. The double clutch apparatus of claim 1, wherein the engine clutch shaft penetrates the first wall of the transmission housing and spline-engaged with the connecting member.

9. The double clutch apparatus of claim 1, wherein the connecting member is fixedly connected to the rotor.

10. The double clutch apparatus of claim 1, wherein the engine clutch includes:
    a reaction plate spline-engaged with the engine output shaft;
    a plurality of engine clutch plates spline-engaged with an internal surface of the reaction plate;
    an engine clutch hub spline-engaged with an external circumference of the engine clutch shaft;
    a plurality of engine clutch disks alternatingly disposed between the plurality of engine clutch plates and spline-engaged with the engine clutch hub; and
    an engine clutch piston disposed adjacent to the reaction plate interposing an elastic member and axially movable to operate the plurality of engine clutch plates and the plurality of engine clutch disks.

11. The double clutch apparatus of claim 10, wherein a cylinder rod of the third slave cylinder is rotatably supported by the engine clutch interposing a bearing.

12. The double clutch apparatus of claim 10, wherein a thrust bearing is interposed between the reaction plate and the engine clutch shaft.

* * * * *